Figure 1A:
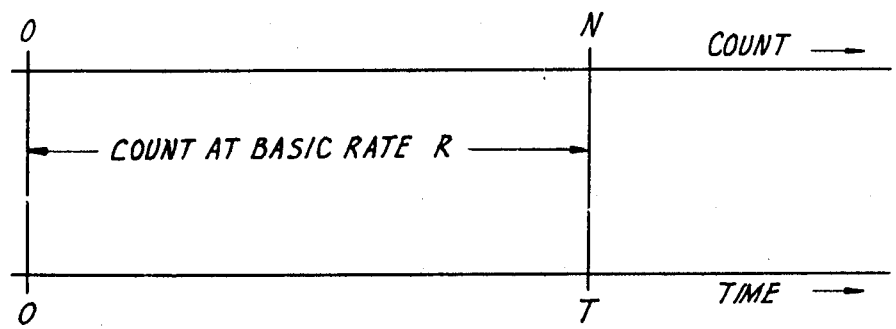

United States Patent [19]

Gurwicz et al.

[11] 4,110,668
[45] Aug. 29, 1978

[54] THYRISTOR PULSE CONTROLLER FOR PLURAL LOADS

[75] Inventors: David Gurwicz; Albert Everett Sloan; Barry Moss; Arthur Wild; William Robert Ord, all of Gateshead, England

[73] Assignee: Sevcon Limited, Gateshead, England

[21] Appl. No.: 761,725

[22] Filed: Jan. 24, 1977

[51] Int. Cl.² ............................................. H03K 3/00
[52] U.S. Cl. ...................................... 318/78; 318/98; 318/139; 180/6.5
[58] Field of Search ................... 318/139, 77, 78, 67, 318/98, 82; 180/6.5

[56] References Cited

U.S. PATENT DOCUMENTS

| 3,596,154 | 2/1969 | Gurwicz et al. | 180/6.5 UX |
| 3,870,935 | 3/1975 | Abels et al. | 180/6.5 X |
| 3,970,160 | 7/1976 | Nowick | 318/67 X |
| 4,028,597 | 6/1977 | Delaney et al. | 318/139 X |
| 4,032,825 | 6/1977 | Klimo | 318/139 |

Primary Examiner—B. Dobeck
Attorney, Agent, or Firm—Wolf, Greenfield & Sacks

[57] ABSTRACT

A pulse controller for controlling the current supply to a plurality of d.c. loads through a respective main thyristor for each load is provided with digital circuitry operable to maintain the mark-space ratios of voltage applied to the loads in a relationship to one another which is set by a differential control circuit whilst the mark-space ratios are simultaneously varied in response to a drive control circuit. The controller may be used to control two d.c. motors respectively driving right-hand and left-hand traction wheels of a battery-electric vehicle, to provide differential drive when the vehicle negotiates a curve.

10 Claims, 8 Drawing Figures

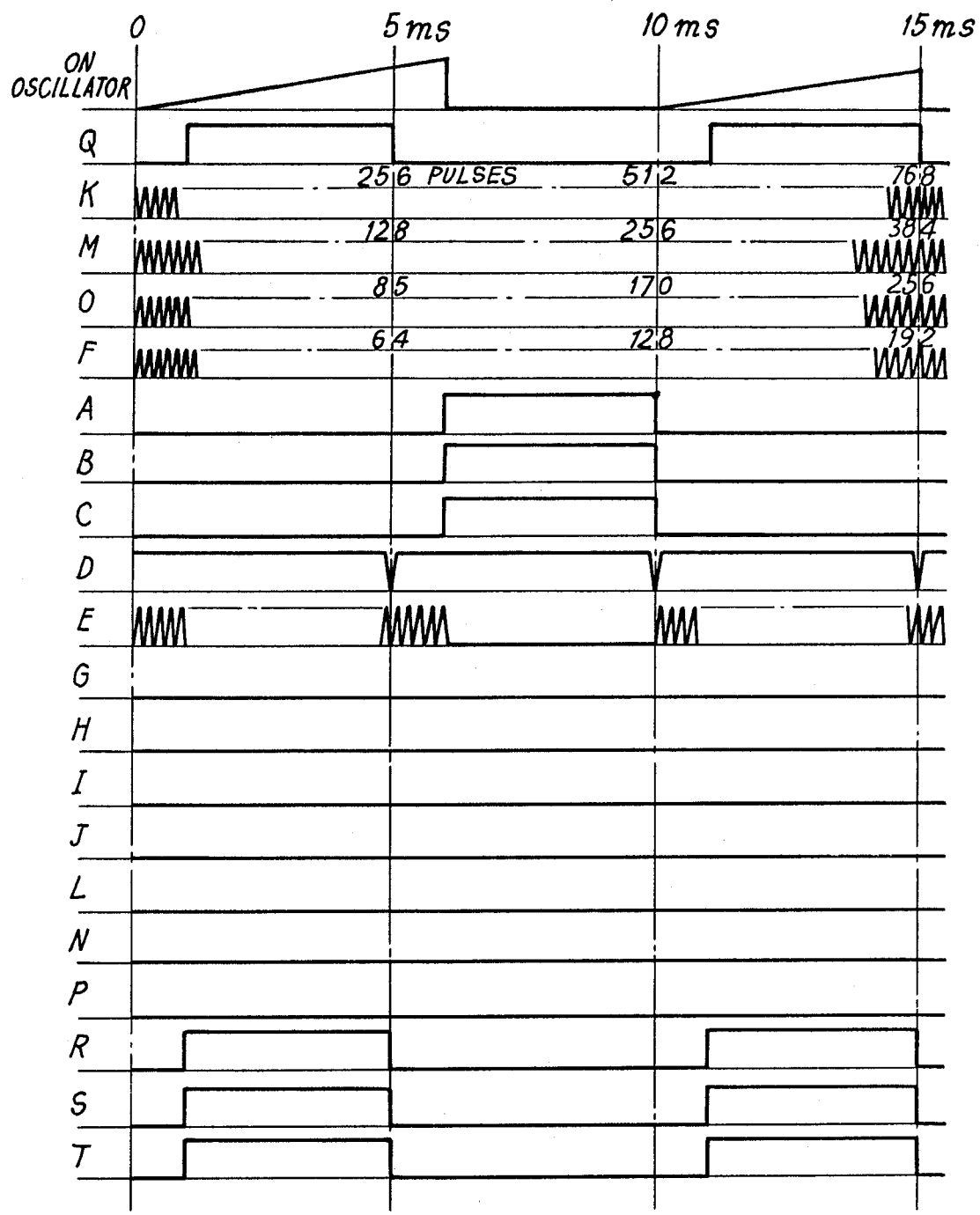

THYRISTOR PULSE CONTROLLER FOR PLURAL LOADS

This invention relates to pulse controllers.

More particularly, the invention relates to pulse controllers for controlling the mean current supplied to each of a plurality of d.c. loads. Such controllers are widely used, especially in the field of d.c. motor control, for example in the control of traction motors of battery-electric industrial vehicles.

It is often necessary to apply voltage to one load at a mark-space ratio which is at a predetermined fraction of the mark-space ratio of voltage applied to another load. For example, in control of two traction motors independently driving wheels on opposite sides of a vehicle, it is desirable, in order to achieve the necessary differential drive when the vehicle negotiates a curve, to apply voltage to the motors at mark-space ratios which bear a relationship to one another determined by the setting of the vehicle steering mechanism. There has hitherto been proposed a differential drive system for a vehicle in which the mark-space ratio of voltage applied to the motors driving the traction wheels is varied in response to voltage signals derived from a potentiometer coupled to the vehicle steering mechanism. Such a system has the disadvantage that it is difficult to ensure that the relationship between the mark-space ratios is precisely and repeatedly in accordance with the setting of the steering mechanism.

According to this invention there is provided a pulse controller for controlling the mean current supplied to each of a plurality of d.c. loads, comprising a plurality of main thyristors for connection in series between respective loads. and a d.c. supply, respective firing circuits for the main thyristors and commutation circuit means for commutating the main thyristors, a clock pulse generator adapted to provide a series of clock pulses at a basic clock rate, commutation control circuit means including counting means arranged to count the clock pulses and to effect commutation of each main thyristor at successive instants separated by a time interval corresponding to a predetermined count of the counting means, firing control circuit means adapted to provide for each main thyristor a control signal at a preset time in each time interval between successive commutations of the thyristor, further counting means associated with at least one of the main thyristors and arranged to provide an output signal at a count equal to the said predetermined count, and differential control circuit means adapted to cause the further counting means to begin counting at the basic clock rate at the start of each time interval and on receipt of a control signal from the firing control circuit means to stop counting at the basic rate and to continue counting at a rate higher than the basic clock rate by a factor determined by the differential control circuit means, the said output signal being provided when the total count equals the said predetermined count, the main thyristor associated with the further counting means being fired into conduction on receipt by the associated firing circuit of the said output signal from the further counting means.

The pulse width of current supplied through the main thyristor associated with the further counting means is equal to the time period between receipt of the output signal from the further counting means and the end of the time interval in which the output signal occurs. This time period bears a ratio to the time period between the occurrence of the control signal from the firing control circuit means and the end of the time interval which is determined solely by the factor by which the counting rate is increased on receipt of the control signal.

Each main thyristor could be provided with circuitry including a further counting means adapted to provide an output signal to effect firing of the thyristor, the control signal from the firing circuit control means being used to effect firing of the thyristor only when the maximum pulse width is required. Alternatively, the control signal could be used only to provide a datum point for operation of the further counting means, firing of the main thyristors always being effected in response to the output signals from the further counting means.

The invention can with advantage be applied to a pulse controller such as that described in application Ser. No. 674,129 filed 6th Apr. 1976 of David Gurwicz and Albert Everett Sloan, now U.S. Pat. No. 4,054,817 in which a common commutating capacitor is provided for all the main thyristors, and the main thyristors are commutated one at a time at intervals not less than the time required to effect charging of the commutating capacitor in the appropriate direction for the next succeeding commutation, so that the capacitor need only have capacitance sufficient to enable commutation of maximum current flow in any one load. In that case, although the time interval between successive commutations is the same for each main thyristor, the points of commutation, i.e. the ends of the intervals, for each thyristor are displaced by a fixed amount from the corresponding points of the time intervals for each other main thryistor. For example, each time interval for one main thyristor could begin after a delay corresponding to a fixed number of clock pulses from the beginning of the corresponding time interval of another main thyristor, a corresponding delay being introduced into the control signal supplied from the firing control circuit means to the first-mentioned main thyristor or the further counting means associated therewith.

The pulse controller of this invention may be employed to control a pair of traction motors driving traction wheels on respective opposite sides of a battery driven vehicle, the firing control circuit means being adapted to vary the instant at which the said control signal is provided in dependence on the setting of a speed control member of the vehicle, thereby to vary simultaneously the pulse width of voltage applied to the two motors, and the differential control circuit being operable in response to the setting of a steering mechanism of the vehicle to render different the mark-space ratios of voltage applied to the two motors when the vehicle negotiates a curve.

Figure 1B:
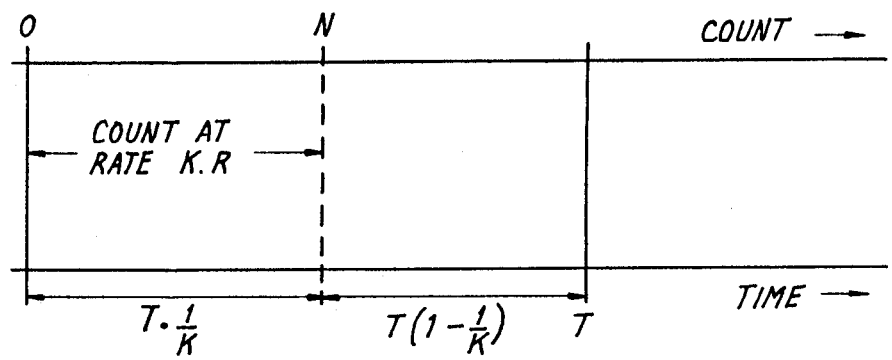
Figure 1C:
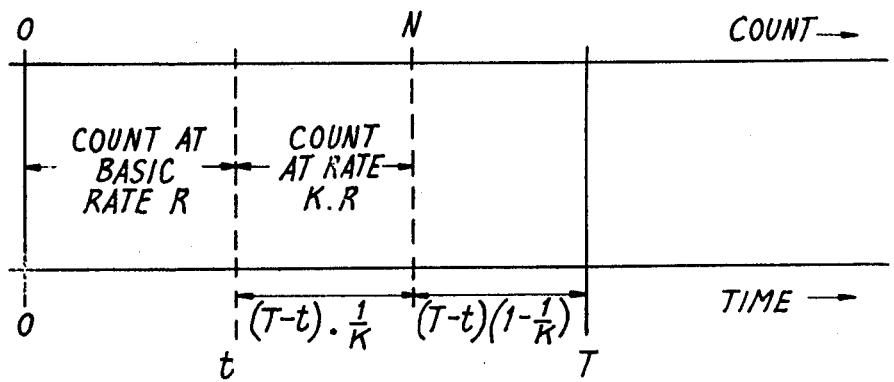
Figure 2A:
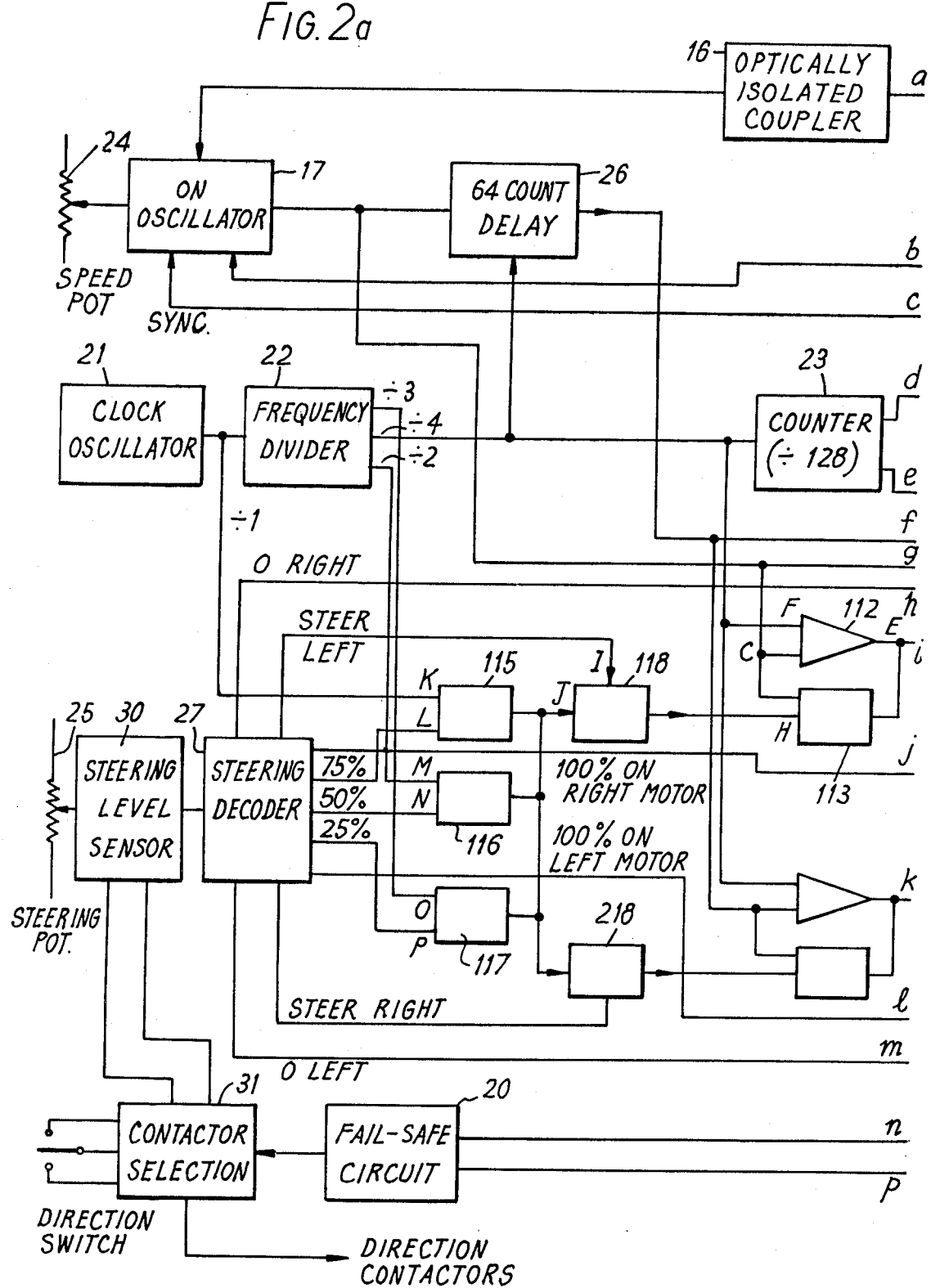
Figure 2B:
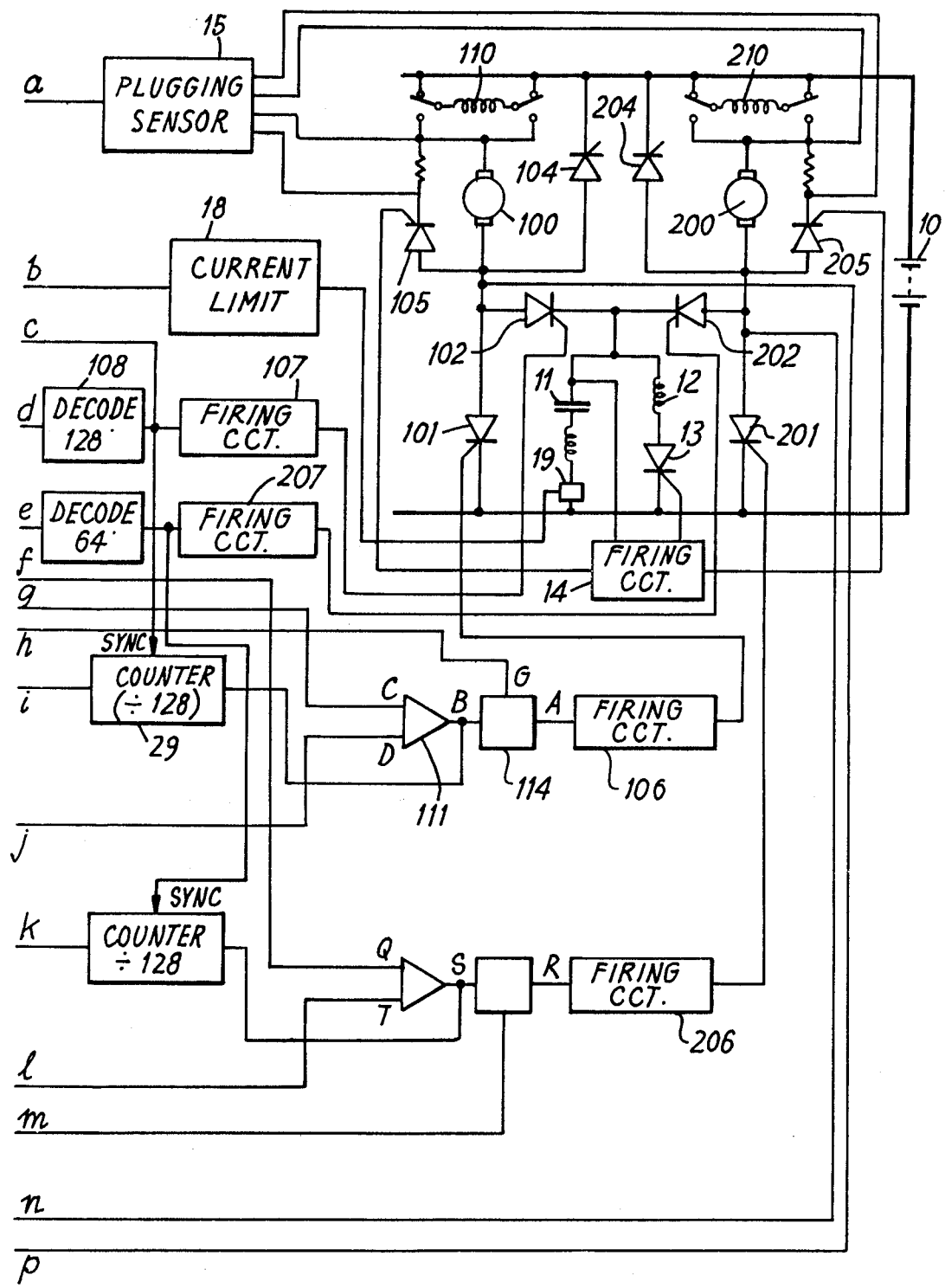
Figure 4:
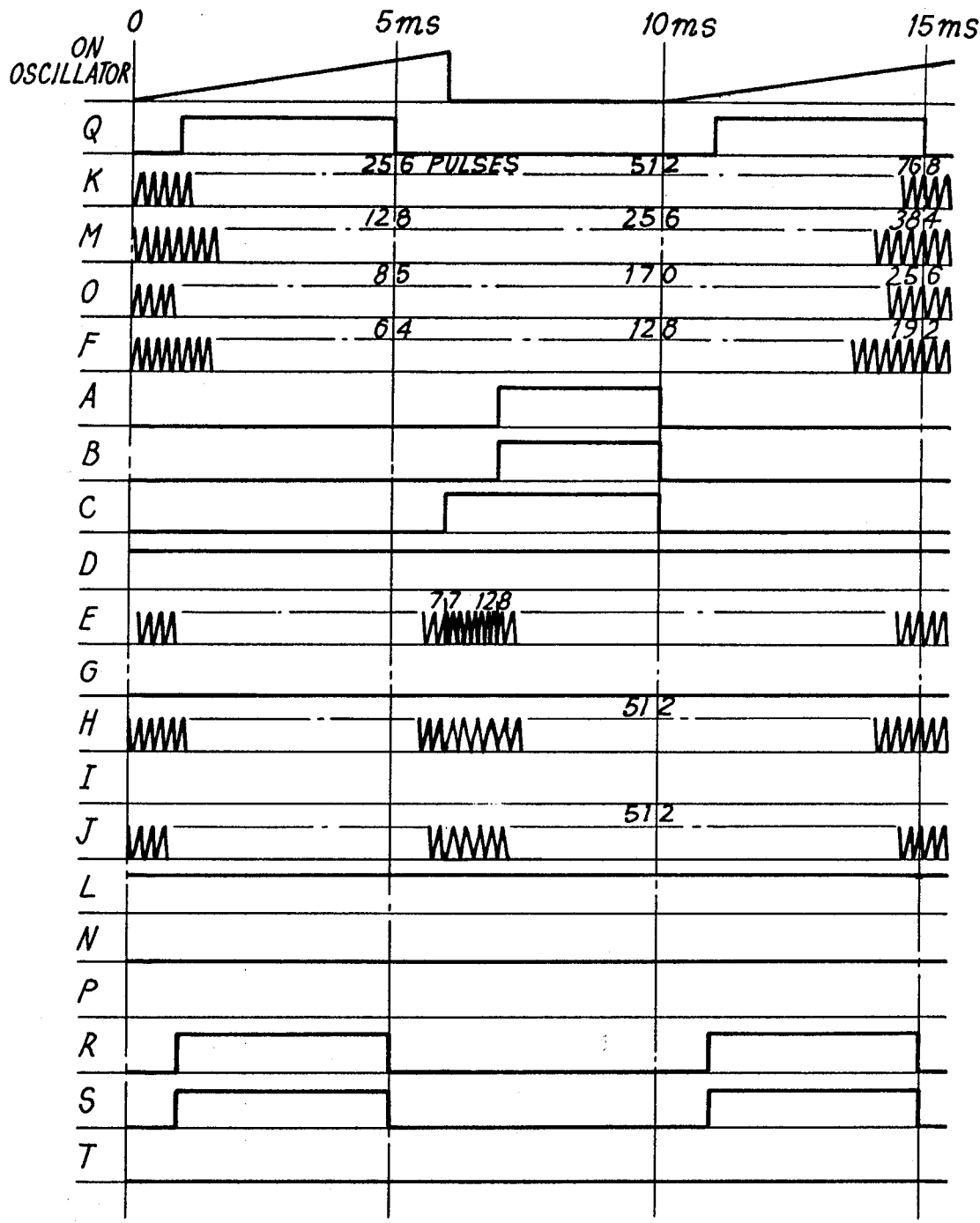
Figure 5:
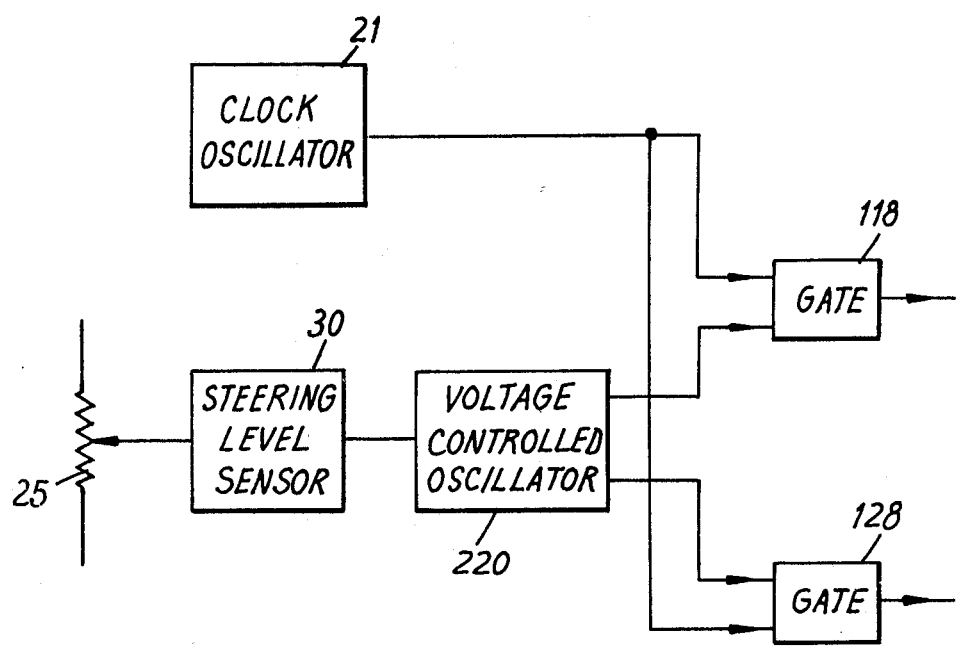

The invention will now be described, by way of example, with reference to the accompanying drawings, in which:

FIGS. 1a, 1b and 1c illustrate diagrammatically the timing principle employed in the pulse controller of the invention, FIGS. 2a and 2b, when joined together so that lines a to p of FIG. 2a are connected respectively to lines a to p of FIG. 2b, for a circuit diagram of a pulse controller for controlling two d.c. traction motors of an electric vehicle, including a block diagram of circuitry for controlling the firing of various thyristors of the controller, FIGS. 3 and 4 show diagrammatically the signals appearing at various points in the circuit of FIGS. 2a and 2b at two different settings of the steering of the vehicle, and FIG. 5 is a diagram of part of a modification of the pulse controller of FIGS. 2a and 2b.

FIGS. 1a to 1c illustrate the timing of the provision of the control signal from the firing control circuit means and the output signal from the further counting means of the pulse controller defined above.

Assume, as shown in FIGS. 1a to 1c, that the time interval between successive commutations of each main thyristor is of length T seconds, corresponding to N clock pulses at a basic rate $R = N/T$ pulses/second, so that as shown in FIG. 1a when counting pulses at the basic rate the count N will be reached at time T. If, as shown in FIG. 1b, the pulse rate is increased from time o by a factor K, the count N will be reached at an earlier time corresponding to T. 1/K seconds. The time remaining after the count N is reached to the end of the time interval T will therefore be reduced to $T(1-1/K)$, i.e. by a factor $(1-1/K)$. Thus a firing signal supplied to the main thyristor at count N will give a pulse width of $T(1-1/K)$.

If, as shown in FIG. 1c, the pulse rate is increased at time t, (coincident with the occurrence of the control signal) from the basic rate R to the higher rate K.R, the count N will be reached in a time, less than $(T-t)$, equal to $(I-t)$ 1/K, so that the time remaining after count N is reached to the end of the time interval T, and therefore the pulse width of the main thyristor, will be reduced from $(T-t)$ to $(T-\text{circuit } t)(1-1/K)$, i.e. by the factor $(1-1/K)$.

It will be apparent that if the control signal from the firing control circuit means is also used to fire another one of the main thyristors at time t, the pulse width of that thyristor will be equal to $(T-t)$, so that the ratio of the pulse widths of the two main thyristors will be equal to the factor $(1-1/K)$. This factor is independent of t, so that by varying t, i.e. by varying the time of occurrence of the control signal from the firing circuit control means the pulse widths of the two main thyristors can be varied simultaneously without varying the ratio between them.

Referring to FIGS. 2a and 2b, a pulse controller for a battery driven vehicle, is employed to control the mean current through D.C. series traction motors 100 and 200 coupled to right and left-hand traction wheels respectively of the vehicle. The motors have respective field windings 100 and 210 provided in known manner with reversal contactors. The motors are further provided with respective thyristors 104 and 204 connected across the armature and field windings for maintaining current flow through the motor during inter-pulse periods and with respective thyristors 105 and 205 connected across the armature. In series with the motors 100 and 200 and a battery 10 of the vehicle are respective main thyristors 101 and 201. The anodes of main thyristors 101 and 201 are connected with the anodes of respective commutating thyristors 102 and 202. The cathodes of thyristors 102 and 202 connect with one plate of commutating capacitor 12, the other plate of which is connected to battery negative. The commutating capacitor 12 together with one of the commutating thyristors 102 and 202 thus forms a shunt across the corresponding main thyristor 101 or 201.

Shunting the commutating capacitor 11 is a charge reversal circuit consisting of an inductor 12 in series with a reversal thyristor 13.

The main thyristors 101 and 201 are provided with respective firing circuits 106 and 206, whilst the commutating thyristors 102 and 202 are provided with respective firing circuits 107 and 207. Reversal thyristor 13 is provided with a firing circuit 14, which also supplied gate signals to the thyristors 105 and 205 across the motor armatures.

The main power circuit of the controller of FIG. 2 is similar to that of the controller described in the said application Ser. No. 674,129. The manner of its operation will now be briefly described.

Let us assume that at the commencement of operation the lower plate of capacitor 11 is positive with respect to the upper plate thereof and the capacitor has enough charge to effect commutation of either main thyristor 101 or main thyristor 201. If now one of the commutation thyristors, say thyristor 102, is rendered conducting, main thyristor 101 is reverse biassed and, accordingly, commutated and capacitor 11 forward charges from the battery via the armature and field windings of motor 100. When the capacitor is fully charged the current through thyristor 102 falls below the hold value of that thyristor which is, accordingly, turned off. Thyristor 13 now fires to effect reversal of the charge on capacitor 11 so that the lower plate of the capacitor becomes positively charged with respect to its upper plate. The capacitor 11 is once again now available to commutate either of thyristors 101 or 201. If it is now desired to commutate thyristor 201, the commutation thyristor 202 is fired into conduction. Capacitor 11, accordingly, reverse biasses thyristor 201 and is discharged and subsequently forward charged via the armature and field winding of motor 200 and commutating thyristor 202. When capacitor 11 is fully charged in the forward direction the current through thyristor 202 falls to below its holding value and that thyristor commutates. Reversal thyristor 13 is then fired to reverse the charge on capacitor 11. When this has taken place capacitor 11 is available for commutation once again of thyristor 101.

The commutating thyristors 102 and 202 are fired alternately, to commutate the main thyristors 101 and 201 alternately, the interval between successive commutations being greater than the time required for the commutating capacitor to be fully charged and subsequently fully reverse charged.

The thyristors 104 and 204 are fired during forward charging of commutating capacitor 11 when the rate of change of forward voltage on the capacitor has fallen to a predetermined fraction of its peak value, or when the forward voltage has reached a preset level, whichever occurs first. The reversal thyristor 13 and armature thyristors 105 and 205 are fired immediately after the commutating capacitor has reached its peak forward charge on commutation of one or other of the main thyristors, the firing circuit 14 supplying a block pulse which begins when the capacitor has reached its peak forward charge and terminates when the capacitor voltage falls below a preset level as it reverse charges through the reversal thyristor. The effect of delaying firing of the thyristors across the armature and across the armature and field winding of each motor is to increase the voltage to which the commutating capacitor 11 is charged on commutation of each main thyristor, part of the energy stored in the armature and field windings of the motor associated with the commutated main thyristors being transferred to the commutating capacitor in the period between commutation of the main thyristor and the firing of the thyristor across the armature and field windings to allow motor current to circulate through that thyristor.

When either of the motors is in a plugging condition, the current flow through the associated armature thyristor 105 or 205 is measured by a plugging sensor circuit 15 including a differential amplifier receiving a signal from a shunt in series with the armature thyristor. The output of the plugging sensor circuit is used to control a photo-coupled transistor circuit 16 which in turn modifies the control signal supplied by oscillator 17, as described below, to provide a controlled current in the loop containing the armature and armature thyristor, thereby to limit the braking torque on the motor.

The pulse controller also includes a current limit circuit 18 which receives a signal from a current transformer 19 sensing current flow through the commutating capacitor and which controls the oscillator 17 to reduce the pulse width of voltage applied to both motors if the current in either motor exceeds a predetermined value, and a fail-safe circuit 20 which monitors the conduction time of both main thyristors and causes the reversal contactors to disconnect the motors from the supply if either thyristor conducts for longer than its normal maximum conduction period.

The circuitry for controlling firing of the main thyristors, commutating thyristors and reversal thyristor will now be described.

A clock oscillator 21 generates clock pulses at a fixed frequency of 51.2 KHz. One output of the clock oscillator is supplied to a frequency divider 22 which provides three outputs consisting of pulses at frequencies equal to the clock oscillator frequency divided by 2, 3 and 4 respectively. The frequency of 51.2 KHz divided by 4, i.e. 12.8 KHz, will hereinafter be referred to as the "basic clock rate", and it will be apparent that the other two outputs of the frequency divider, and also the direct output from the clock oscillator, are at frequencies higher than the basic clock rate by factors of 2, 4/3, and 4 respectively.

The output of the frequency divider at the basic clock rate is supplied to a counter 23 which, through decoder 108, provides an output signal to the firing circuit 107 of commutating thyristor 102 once every 128 basic clock rate pulses, i.e. once every 10 milliseconds. A decoder 208 provides a signal to firing circuit 207 of commutating thyristor 202 at count 64 in each counting cycle of counter 26, i.e. 5 milliseconds after the signal to firing circuit 107. Thus commutating thyristors 102 and 202 are each fired once every ten milliseconds, thyristor 202 being fired 5 milliseconds later than thyristor 102.

Firing of the main thyristors 101 and 201 is controlled in dependence on the settings of a speed potentiometer 24 coupled to the vehicle accelerator pedal and a steering potentiometer 25 coupled to the vehicle steering wheel. The control is such that depression of the accelerator pedal produces an increase in pulse width of current to both motors, whilst turning of the vehicle steering wheel to produce, say a right-hand turn causes the pulse width of current to the right-hand motor to decrease whilst that to the left-hand motor remains the same, so that different mean voltages are applied to the motors appropriate to the different speeds required as the vehicle negotiates a right-hand bend. An oscillator 17 provides a control signal to circuitry controlling the firing of main thyristor 101 after a time delay from the beginning of each 10 millisecond interval defined by counter 23, the time delay being dependent on the setting of the speed potentiometer 24. The control signal is also supplied to circuitry controlling the firing of main thyristor 201 through a 64-count delay circuit 26 which delays the signal by 64 basic clock pulses, or 5 milliseconds, corresponding to the interval between commutation of thyristor 101 and commutation of thyristor 201.

The circuits for controlling firing of the main thyristors 101 and 201 are essentially similar, the only difference in operation being that the control signal from oscillator 17 to circuits controlling firing of thyristor 201 is delayed by 5 milliseconds as compared to the control signal to circuits controlling the firing of thyristor 101. Accordingly, only the circuits controlling firing of thyristor 101 (associated with the right-hand motor) will be described in detail.

The control signal from oscillator 17 is supplied to input terminals of gate circuits 111, 112 and 113. The inputs of the circuits receiving the control pulse are each marked C. When the vehicle steering wheel is set for the straight ahead position, a signal from the steering decoder 27, described below, forming input D to gate 111, allows the control signal at C to cause the output B of gate 111 to rise positive and hence signal A at the output of gate circuit 114 to rise positive, causing the firing circuit 106 to fire main thyristor 101. Thus thyristor 101 is fired in response to the control signal from oscillator 17 at a time from the last commutation if thyristor 101 determined by the setting of the speed potentiometer 24.

The other input F to gate circuit 112 is taken from the frequency divider 22 and consists of pulses at the basic clock rate. In the absence of the control signal C from oscillator 17, these pulses are supplied through gate 112 to form input E to a further counter 29. The counter 29 is reset by a synchronising signal from decoder 108 of counter 23 at each commutation of main thyristor 101, and provides an output pulse when a count of 128 is reached. The output pulse is supplied to input B of gate 114. The control signal C from oscillator 17 clamps gate 111 to prevent an output appearing at E. Thus, in the straight ahead position, the count at E will not reach 128 before the output is clamped by signal C, so that no output signal is supplied by counter 29 to input B of gate 114.

The voltage signal from steering potentiometer 25 is supplied to a "steering level" circuit 30, comprising an analogue to digital converter which provides a digital output dependent on the voltage signal from potentiometer 25. The digital output is supplied to steering decoder 27 which decodes the digital output to provide a number of output signals, as described below. Steering decoder 27 has outputs L, N and P corresponding to settings of the steering wheel which require the voltage applied to the motor on the inside of the bend to be negotiated to be reduced to 75%, 50% and 25% respectively of the voltage demanded by oscillator 17. The outputs L, N and P form inputs to respective gate circuits 115, 116 and 117, which also receive as inputs the outputs of clock oscillator 21 and frequency divider 22. Thus circuit 115 receives an input K direct from the clock oscillator, at a frequency equal to four times the basic clock rate, and circuits 116 and 117 receive inputs M and O from the frequency divider at frequencies corresponding to the basic clock rate multiplied by 2 and 4/3 respectively. In the straight ahead position, as mentioned above, the steering decoder 27 supplies an input D to gate circuit 111 indicating that the right-hand motor is to be driven at a voltage equal to 100% of that demanded by the speed potentiometer 24 and oscillator 17, i.e. that the pulse controller should be operated at a pulse-width equal to 100% that demanded by oscillator 17. If the vehicle steering wheel is turned to demand a right-hand turn, the input D changes in such a way as to prevent the control signal C from oscillator 17 being supplied direct to firing circuit 107 of commutating thyristor 102. If the turn demanded by the steering wheel is 30%, requiring a reduction of the voltage applied to the right hand motor to 75%, the signal L from steering decoder 27 allows the pulses at a frequency four times the basic rate forming input K to appear at the input J of a gate circuit 118 and also at the input of the corresponding gate circuit 218 associated with the left-hand motor. Gate 218 is however clamped by a "steer right" signal from the steering decoder, whilst gate 118 (which would similarly be clamped by a "steer left" signal if the steering wheel were set to demand a left turn) allows the pulses to be fed to input H of gate 113. When the control signal C appears at the other input of gate 113, the pulses are fed to the input E to counter 29.

The result of this is that during the first part of the time interval between successive commutations of main thyristor 101, until the occurrence of control signal C from oscillator 17, pulses at the basic clock rate appear at the input E to counter 29. On the occurrence of the control signal, gate 112 is clamped and gate 113 is unclamped, so that pulses then appear at E at a frequency four times the basic clock rate. The counter 29 thus counts at the basic pulse rate until the occurrence of control signal C, and then counts at a rate four times as high until the count of 128 is reached, whereupon a signal appears at B causing the firing circuit 106 to fire main thyristor 101. The firing of thyristor 101 is therefore delayed, as compared with the straight ahead situation described above, to decrease the pulse width of voltage applied to the right-hand motor.

For example, if the speed potentiometer 24 and oscillator 17 are set to give, in the straight-ahead position, a pulse width of 40% of the time interval between successive commutations of the main thyristor, the oscillator will provide a control signal at a point 4 milliseconds before the subsequent commutation of the main thyristor 101, i.e. after a delay of 6 milliseconds (corresponding to 77 basic rate clock pulses) from the start of the time interval beginning with the preceding commutation. At the occurrence of the control signal, therefore, counter 29 will have reached a count of 77. The remaining 51 pulses needed to reach a count of 128 will be provided at four times the basic clock rate, and so will be counted in a quarter of the time required to count the same number of pulses at the basic rate, i.e. in 1 millisecond. The firing of thyristor 101 will therefore be delayed by 1 millisecond and the pulse width will be reduced to 3 milliseconds, i.e. to the required 75% of the pulse width demanded by oscillator 36.

If the steering wheel is turned further, the signal at L will change state, to prevent pulses from the clock oscillator appearing at J, and the signal at the input N of gate 116 will change state to allow pulses from the frequency divider at a frequency of twice the basic clock rate to appear at J. Pulses at twice the basic clock rate are therefore fed to counter 29 on the supply of control signal C, so that the firing of main thyristor 101 is further delayed to give a pulse width equal to 50% of that demanded by the speed potentiometer 24 and oscillator 17. Similarly, further turning of the steering wheel causes the signals at N and P to change state so that pulses at a frequency of 4/3 the basic clock rate are supplied through circuit 117 to point J and hence to counter 29, so that the firing of thyristor 101 is delayed to give a pulse width of 25% that demanded by the speed potentiometer 24 and oscillator 17.

As the steering is increased further a signal is supplied from the steering decoder 27 to input G of gate 114 which prevents any signal being supplied to the firing circuit 106. The main thyristor 101 is therefore not fired at all, so that the only current supplied to the right-hand motor is the forward charging current for the commutating capacitor. Further increase in steering causes the steering level circuit 30 to supply a signal to a reversal contactor selection circuit 31, causing the contactors of the right-hand motor to be reversed. On further increase in steering the clamp G on gate 114 is removed and the motor driven in reverse at 25% of the pulse width demanded. Still further increase in steering then causes the described circuitry to increase the pulse width to 50%, then to 75% of that demanded until, at full steering lock, the right-hand motor is driven in reverse at a pulse width of 100% that demanded by the oscillator.

On a left-hand turn, similar circuitry associated with the left-hand motor causes the firing of thyristor 201 to be controlled to vary the mean voltage applied to that motor whilst the mean voltage applied to the right-hand motor is maintained at that demanded by oscillator 17.

It will be apparent that if the speed potentiometer is adjusted by movement of the accelerator pedal then the pulse width of voltage applied to both motors will be altered proportionately, without altering the ratios between the pulse widths determined by the setting of the steering mechanism. Moreover, since the fraction by which the pulse width of current to either motor is altered in response to a signal from the steering decoder is dependent only on the relative frequencies of the higher rate pulses and the basic clock rate, that fraction is always precisely predetermined.

FIG. 3 shows diagrammatically the signals appearing at various points in the circuit of FIG. 2 when the vehicle is driving straight ahead with voltage applied to both motors at a pulse width of 40% of the interval between successive commutations of the main thyristor.

FIG. 4 shows diagrammatically the signals appearing at various points in the circuit of FIG. 2 when the steered wheels of the vehicle have been turned to the right through an angle of 30° to the longitudinal axis of the vehicle, with voltage supplied to the left-hand motor at a pulse width of 40% of the interval between successive commutations of the main thyristor, and voltage supplied to the right-hand motor at a pulse width 75% of the pulse-width of voltage to the left-hand motor.

The described embodiment operates entirely on pulse-width control. However if the clock oscillator 21 were arranged to provide a variable frequency output, the pulse frequency of voltage applied to both motors could be simultaneously varied by varying the length of the 128-count interval between successive commutations of the main thyristors.

FIG. 5 shows a modification of the described embodiment in which the frequency divider and its various outputs are dispensed with and the clock oscillator 21 used only to provide pulses at the basic clock rate. The higher frequency pulses are provided by a voltage controlled oscillator 220 producing pulses at a frequency dependent on a voltage signal derived from the steering potentiometer 25 via the steering level sensor 30, the arrangement being such that the ratio of the frequency of the voltage-controlled oscillator to the basic clock rate varies with the setting of the vehicle steering mechanism in the appropriate manner to give the desired relationship between the steering angle and the relative mean voltages applied to the motors. In this way a continuously variable control of the relative mean voltage applied to the motors as the steering wheel is turned can be obtained.

It will be appreciated that the invention could be applied to control the current supply to loads other than d.c. motors, and could be applied to control current supply to more than two loads.

We claim:

1. A pulse controller for controlling the mean current supplied to each of a plurality of d.c. loads, comprising a plurality of main thyristors for connection in series between respective loads and a d.c. supply, respective firing circuits for the main thyristors and commutation circuit means for commutating the main thyristors, a clock pulse generator adapted to provide a series of clock pulses at a basic clock rate, commutation control circuit means including counting means arranged to count the clock pulses and to effect commutation of each main thyristor at successive instants separated by a time interval corresponding to a predetermined count of the counting means, firing control circuit means adapted to provide for each main thyristor a control signal at a preset time in each time interval between successive commutations of the thyristor, further counting means associated with at least one of the main thyristors and arranged to provide an output signal at a count equal to the said predetermined count, and differential control circuit means adapted to cause the further counting means to begin counting at the basic clock rate at the start of each time interval and on receipt of a control signal from the firing control circuit means to stop counting at the basic rate and to continue counting at a rate higher than the basic clock rate by a factor determined by the differential control circuit means, the said output signal being provided when the total count equals the said predetermined count, the main thyristor associated with the further counting means being fired into conduction on receipt by the associated firing circuit of the said output signal from the further counting means.

2. A pulse controller as claimed in claim 1, in which there are provided means for supplying pulses at a frequency higher than the basic clock rate by a factor determined by the differential control means, and gate means associated with the said main thyristor and through which pulses can be supplied from the clock pulse generator and the said pulse-supplying means to the associated firing circuit, the gate means being operated at the start of each time interval to supply pulses at the basic rate to the further counting means and upon receipt of the control signal from the firing control circuit means to supply pulses at the higher frequency to the further counting means associated with the said main thyristor.

3. A pulse controller as claimed in claim 2, in which the pulse supplying means has a plurality of outputs each adapted to supply pulses at a frequency higher than the basic clock rate by a predetermined factor, which factor is different for each of the outputs, and the gate means includes a respective gate through which the output can be connected to the firing circuit means and which is operable in response to a signal from the differential control circuit means.

4. A pulse controller as claimed in claim 3, in which the clock pulse generator and the pulse supplying means together comprise an oscillator adapted to generate pulses at the highest frequency required and a frequency divider connected to the output of the oscillator and providing a plurality of outputs at lower frequencies derived from the output of the oscillator, are of the outputs of the frequency divider providing the said pulses at the basic clock rate.

5. A pulse controller as claimed in claim 2, in which the pulse-supplying means comprises a controlled oscillator adapted to supply pulses at a frequency which is continuously variable in dependence on the magnitude of a signal from the differential control circuit means.

6. A pulse controller as claimed in claim 1, in which there are provided means for supplying the control signal from the firing control circuit means associated with the said main thyristor direct to the firing circuit of that thyristor thereby to effect firing of the thyristor when the firing control circuit means is set to demand maximum pulse width for that thyristor.

7. Apparatus as claimed in claim 1 in which each of the main thyristors is provided with respective further counting means adapted to begin counting at the basic clock rate at the start of each time interval and on receipt of a control signal from the firing control circuit means to stop counting at the basic rate and continue counting at a rate higher than the basic clock rate by a factor determined for each further counting means by the differential control circuit means.

8. A pulse controller as claimed in claim 1, in which the commutation circuit means includes a common commutating capacitor for all the main thyristors and the main thyristors are commutated one at a time at intervals not less than the time required to effect charging of the commutating capacitor in the appropriate direction for the next succeeding commutation, the commutating control circuit means being adapted to effect commutation of each main thyristor after a delay corresponding to a predetermined number of clock pulses from the commutation of the preceding main thyristor, a corresponding delay being introduced into the control signal supplied from the firing control circuit means to the first-mentioned main thyristor or the further counting means associated therewith.

9. A pulse controller as claimed in claim 1, and adapted to control a pair of traction motors respectively driving traction wheels on opposite sides of an electric vehicle, in which there are provided respective main thyristors associated with the two motors, and in which the firing control circuit means is adapted to vary the instant at which the said control signal is provided in dependence on the setting of a speed control member of the vehicle, thereby to vary simultaneously the pulse width of voltage applied to the two motors, and the differential control circuit means is operable in response to the setting of a steering mechanism of the vehicle to render different the mark-space ratios of voltage supplied to the two motors when the vehicle negotiates a curve.

10. An electrically-driven vehicle having two traction motors respectively driving traction wheels on opposite sides of the vehicle, in which the motors are controlled by a pulse controller as claimed in claim 9.

* * * * *